Patented Oct. 14, 1941

2,259,354

UNITED STATES PATENT OFFICE 2,259,354

VULCANIZATION OF RUBBER

Winfield Scott, Akron, Ohio, assignor to Wingfoot Corporation, Wilmington, Del., a corporation of Delaware No Drawing. Application August 20, 1937, Serial No. 160,138

12 Claims. (Cl. 260—788)

This invention relates to the vulcanization of rubber. More particularly, it relates to the vulcanization of rubber utilizing as accelerators a class of new materials not hitherto employed for this purpose. It includes the new materials, the method of preparing them, their use in the vulcanization of rubber and the rubber products obtained.

It has been heretofore known that mercaptoarylthiazoles could be reacted with formaldehyde and primary aromatic amines to form materials useful as accelerators of vulcanization, such materials being described in U. S. Patent No. 2,010,059. It is there indicated that when 2-mercaptobenzothiazole, formaldehyde, and aniline are reacted, a compound is obtained which may be called 2-(phenyl amino methyl) mercaptobenzothiazole.

It has now been discovered that mercaptoarylthiazoles, formaldehyde and salts of primary aromatic amines as distinguished from the amines themselves, may be reacted to yield a new class of materials definitely distinguishable by analysis and physical characteristics from those of the patent aforementioned. These new products are useful as accelerators of vulcanization.

In practice, the invention may be carried out in any one of several ways. According to one method, the amine and acid are reacted in equivalent amounts to form the amine salt and this material is then further reacted with formaldehyde and the mercaptoarylthiazole. It is not necessary, however, to preform and isolate the amine salt but it is possible to form the amine salt in situ. If this be done, however, the acid should preferably be present prior to the addition of the amine in order to insure the progress of the reaction according to the present invention instead of according to the process of U. S. Patent No. 2,010,059. The mercaptoarylthiazole and the formaldehyde may be employed as such, but it is also possible to use them as a preformed 2-methylol mercaptoarylthiazole. Any of these variations will produce the desired effect being the equivalent, in fact, of a reaction of the mercaptoarylthiazole, formaldehyde and the salt of the primary aromatic amine.

Following is an example demonstrating the practice of the invention.

Example 1

300 cc. of alcohol, 167 grams of 2-mercaptobenzothiazole and 85 grams of 37% formaldehyde were charged into a reactor equipped with a stirrer. The mixture was heated to about 50° C. for a period of 10–15 minutes when a solution of aniline hydrochloride made up of 93 grams of aniline, 50 cc. of alcohol and 120 cc. of concentrated (36%) hydrochloric acid was added. There was a slight temperature rise and a homogeneous solution was formed. After stirring for a few minutes, the solution became turbid and a yellow solid began to precipitate. The heating was continued with gentle refluxing for about five hours. The contents of the reactor were then allowed to stand several hours at room temperature when the reaction mixture was filtered off and washed with alcohol. The product was a canary-yellow solid and when dried weighed 245 grams. It was found to be rather insoluble in the ordinary organic solvents. For analysis the material was purified by boiling it with ethyl acetate and washing successively with benzene, acetone and petroleum ether. Thus purified it melted at 220–222° C. The analysis calculated for $C_{14}H_{13}N_2S_2Cl$ is N–9.1% and S–20.7%. Actual analysis showed N–9.5% and S–20.4%.

The following procedure demonstrates the practice of the invention using the same ingredients as in Example 1 but adding the amine and acid separately to the reaction mix.

Example 2

167 grams of 2-mercaptobenzothiazole were suspended in 400 cc. of alcohol and to this were added 84 grams of 36% formaldehyde. After stirring for a few minutes 150 cc. of concentrated (36%) hydrochloric acid were added followed by the addition of 93 grams of aniline. The reaction mixture was heated with stirring for three hours and was then allowed to stand for about 18 hours. At the end of this time the reaction product was in the form of a rather thick mush. This was stirred up and added to one liter of cold water, forming a yellow suspension. Sodium carbonate solution was added until the aqueous portion was alkaline to litmus. The solid was then filtered off and washed. It consisted of a light yellow powder weighing 263.5 grams which represented a yield of 96%, assuming that the product was formed by the equimolecular reaction of the ingredients.

The following example demonstrates the practice of the invention employing another acid, namely sulfuric, in place of the hydrochloric acid of the preceding examples.

Example 3

A suspension was formed of 16.7 grams of 2-mercaptobenzothiazole in 50 cc. of alcohol and to this were added 8.5 grams of 37% formaldehyde. The mixture was heated to 50° C. and to it was added a mixture of 9.3 grams of aniline with 30 cc. of alcohol and 10 cc. each of sulfuric acid and water. On mixing, the mass became warm and a homogeneous solution was formed. After standing for about 15 minutes a yellow solid began to precipitate and in a short time the entire mass became a mush of liquid and yellow solid. It was allowed to stand overnight and was then filtered and the filter cake washed with fresh alcohol. The product was a light yellow powder weighing 24.7 grams. It was insoluble in alcohol, benzene, chloroform and ether, but very soluble in pyridine. It melted completely above 200° C.

The following example sets forth an alternative method of preparing the materials of the invention and illustrates the use or ortho toluidine in place of the aniline of Examples 1–3.

*Example 4*

To 39.4 grams of 2-methylol mercaptobenzothiazole were added 28.7 grams of ortho toluidine hydrochloride. This mixture was refluxed in 100 cc. of alcohol for six hours. On cooling, a crystalline product was obtained which, on purification by recrystallization from methyl alcohol by the addition of ether, was a white granular solid melting at 192–3° C. The calculated analysis for $C_{15}H_{15}N_2S_2Cl$ is N–8.7% and S–19.8%. Actual analysis of the above showed N–8.8% and S–20.0%.

The foregoing examples indicate the manner in which the materials of the invention may be prepared. However, many variations may be made in the procedure both by way of modifying the conditions of the reaction and the ingredients employed. For example, in place of the aniline and ortho toluidine of the examples, one may employ any other primary aromatic amine. Further representative examples are m- and p-toluidine, the xylidines, the anisidines, phenetidines, alpha and beta naphthylamines, p-amino phenol, o-amino m-cresol, p, p' diamino diphenyl, 4-4' diamino diphenyl methane, amino phenanthrene, amino diphenyl oxide, p-amino dimethyl aniline, 2-4-diamino phenyl naphthyl ether, amino methyl naphthalenes, m-tolylene diamine, 4-4' diamino 3-methyl diphenyl methane, p-amino diphenyl, o-chloraniline, etc. Other primary aromatic amines than those listed including amines containing various substituent groups such as halogen, $HSO_3$, OH, alkoxy, aryloxy, nitro, etc. may be likewise employed.

Also, the 2-mercaptobenzothiazole of the examples may be replaced by any other mercaptoarylthiazole, such as 2-mercapto 6-nitro benzothiazole, 2-mercapto 6-chlor benzothiazole, 2-mercapto 4-phenyl benzothiazole, 2-mercapto 4-methyl benzothiazole, 2-mercapto 6-ethoxy benzothiazole, 2-mercapto 6-methoxy benzothiazole, 2-mercapto 6-chlor 5-nitro benzothiazole, 2-mercapto 6-hydroxy benzothiazole, 2-mercapto 5-nitro benzothiazole, 2-mercapto 5-chlor benzothiazole, the 2-mercapto alpha and beta naphthothiazoles, and other alkyl, aryl, nitro, amino, hydroxy, halo, alkoxy, etc. derivatives of mercaptothiazoles. However, the mercaptobenzothiazoles are preferred.

Other representative acids which may be employed are benzene sulfonic, phosphoric, hydrobromic, etc. In general, the stronger acids are preferred and the strong oxidizing acids should be avoided since more or less of the mercaptothiazole is oxidized to the corresponding disulfide. However, even these latter tend to promote the formation of the compounds of the invention.

In the specific examples given above there is employed a quantity of acid at least sufficient to form the salt of the primary aromatic amine and in some cases an excess is used. This method produces the preferred class of accelerators within the scope of the invention and results in a substantially complete conversion of the reacting ingredients to the compounds of the invention. However, smaller quantities of acids tend to produce the desired reaction, probably forming mixtures of the compounds of the present invention with those of the type disclosed in U. S. Patent No. 2,010,059. The formation of the characteristic compounds is not appreciable, however, when extremely small quantities of acid are employed and the acid should consequently be present in quantity amounting to at least 10% of the amount necessary to form the amine salt.

The products of the invention, when prepared using amounts of acid sufficient to form the amine salt, are well characterized compounds, in some cases being definitely crystalline. Also, in connection with certain of the examples are given analytical data which agree very closely with calculated values for a certain assumed formula. In spite of this, however, it is not known in what manner the reaction proceeds nor what formula should be attributed to the products. They are, therefore, claimed as reaction products only. When smaller amounts of acid are used the products are mixtures which are resinous or oily in nature and may be employed as such without separation into components or other purification.

In order to test the efficacy of the materials, they were incorporated into rubber and cured. Thus, the product of Example 2 was incorporated into rubber in accordance with the following formula:

| | Parts |
|---|---|
| Smoked sheet rubber | 100 |
| Zinc oxide | 5 |
| Sulfur | 3 |
| Diphenylguanidine | 0.15 |
| Accelerator | 0.35 |

Samples were cured and tested to yield the following data:

| Cure mins. at °F. | Tens. kgs./cm.$^2$ | Elong. | Modulus in kgs./cm.$^2$ | |
|---|---|---|---|---|
| | | | 500% | 700% |
| 20/260 | 118 | 750 | 23 | 90 |
| 30 | 155 | 750 | 20 | 116 |
| 40 | 168 | 745 | 33 | 127 |
| 60 | 164 | 710 | 39 | 154 |
| 80 | 180 | 730 | 37 | 149 |

Materials of this type have but little accelerating power when used alone but in combination with other accelerators (in the above case by activation with a small amount of diphenylguanidine) their desirable accelerating properties are brought out. Even when used with an activator they show no tendency to scorch under ordinary processing conditions.

The accelerator compositions and the method of preparing them are claimed in copending patent Serial No. 385,076, filed March 25, 1941.

Although only the preferred embodiments of the invention have been disclosed, it will be apparent to those skilled in the art that various modifications may be made therein without departing from the spirit of the invention or the scope of the appended claims.

What I claim is:

1. The method of treating rubber which comprises vulcanizing the same in the presence of a compound obtained by reacting formaldehyde, a salt of a primary aromatic amine, and a compound having the formula

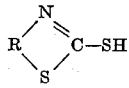

in which R is an arylene radical.

2. The method of treating rubber which comprises vulcanizing the same in the presence of a compound obtained by reacting formaldehyde, an inorganic acid salt of a primary aromatic amine, and a compound having the formula

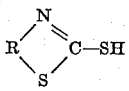

in which R is an arylene radical.

3. The method of treating rubber which comprises vulcanizing the same in the presence of a compound obtained by reacting formaldehyde, a salt of a primary aromatic amine, and a compound having the formula

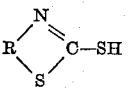

in which R is phenylene.

4. The method of treating rubber which comprises vulcanizing the same in the presence of a compound obtained by reacting formaldehyde, a salt of a primary aromatic amine, and 2-mercaptobenzothiazole.

5. The method of treating rubber which comprises vulcanizing the same in the presence of a compound obtained by reacting formaldehyde, a salt of a monocyclic primary aromatic amine, and a compound having the formula

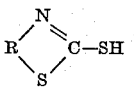

in which R is arylene.

6. The method of treating rubber which comprises vulcanizing the same in the presence of a compound obtained by the reaction of about one mol of formaldehyde, about one mol of a salt of a primary aromatic amine, and about one mol of a compound having the formula

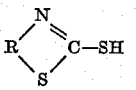

in which R is arylene.

7. The method of treating rubber which comprises vulcanizing the same in the presence of a compound obtained by reacting formaldehyde, aniline hydrochloride and 2-mercaptobenzothiazole.

8. The method of treating rubber which comprises vulcanizing the same in the presence of a compound obtained by reacting formaldehyde, the hydrochloride of a primary aromatic amine, and a compound having the formula

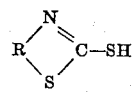

in which R is arylene.

9. The method of treating rubber which comprises vulcanizing the same in the presence of a compound obtained by reacting formaldehyde, the hydrochloride of a primary aromatic amine, and a compound having the formula

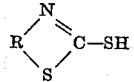

in which R is phenylene.

10. A rubber product which has been vulcanized in the presence of a compound obtained by reacting formaldehyde, a salt of a primary aromatic amine, and a compound having the formula

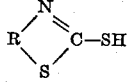

in which R is arylene.

11. A rubber product which has been vulcanized in the presence of a compound obtained by reacting formaldehyde, a salt of a primary aromatic amine, and a compound having the formula

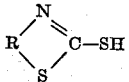

in which R is phenylene.

12. A rubber product which has been vulcanized in the presence of a compound obtained by reacting formaldehyde, a salt of a monocyclic primary aromatic amine, and a compound having the formula

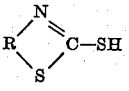

in which R is arylene.

WINFIELD SCOTT.